(12) United States Patent
Lennon

(10) Patent No.: US 6,624,843 B2
(45) Date of Patent: Sep. 23, 2003

(54) CUSTOMER IMAGE CAPTURE AND USE THEREOF IN A RETAILING SYSTEM

(76) Inventor: Jerry W. Lennon, 7719 Butternut Ct., Woodridge, IL (US) 60517

(*) Notice: Subject to any disclaimer, the term of this patent is extended or adjusted under 35 U.S.C. 154(b) by 384 days.

(21) Appl. No.: 09/733,197

(22) Filed: Dec. 8, 2000

(65) Prior Publication Data

US 2002/0073077 A1 Jun. 13, 2002

Related U.S. Application Data

(60) Provisional application No. 60/170,057, filed on Dec. 10, 1999.

(51) Int. Cl.[7] .............................. H04N 9/47; H04N 7/18
(52) U.S. Cl. ........................................................ 348/61
(58) Field of Search .............................. 348/61, 63, 64, 348/78, 86, 96; H04N 9/47, 7/18

(56) References Cited

U.S. PATENT DOCUMENTS

| | | | |
|---|---|---|---|
| 4,467,349 A | | 8/1984 | Maloomian |
| 4,539,585 A | * | 9/1985 | Spackova et al. ........... 382/100 |
| 4,991,005 A | | 2/1991 | Smith |
| 5,053,956 A | | 10/1991 | Donald et al. |
| 5,515,268 A | | 5/1996 | Yoda |
| 5,551,021 A | | 8/1996 | Harada et al. |
| 5,592,248 A | | 1/1997 | Norton et al. |
| 5,771,778 A | * | 6/1998 | MacLean, IV ............. 99/323.6 |
| 5,930,769 A | | 7/1999 | Rose |
| 5,983,201 A | | 11/1999 | Fay |
| 6,236,319 B1 | * | 5/2001 | Pitzer et al. ............. 340/573.4 |
| 6,298,218 B1 | * | 10/2001 | Lowe et al. .................. 455/66 |

OTHER PUBLICATIONS

PCT International Search Report, pp. 1–4.
"Welcome to My Virtual Model" website located at http://wwwservices1.landsend.com/landsend/menu.htm?sid=0975533902029, printed on Nov. 29, 2000.
Written Opinion for International Application No. PCT/US00/42703 dated Dec. 5, 2001.

* cited by examiner

Primary Examiner—Nhon Diep
(74) Attorney, Agent, or Firm—Banner & Witcoff, Ltd.

(57) ABSTRACT

In a retailing system, an image capture system is provided and used to capture reference images of models wearing apparel items. At a retailer's place of business, an image capture system substantially identical to that used to capture the reference images is also provided. A customer has his or her image captured by the image capture system at the retailer's place of business. Subsequently, when the customer is in close proximity to an image display area within the retailer's place of business, a composite image comprising the customer's captured image and one of the reference images may be provided. The composite image may comprise full motion video or still images. In this manner, the customer is given the opportunity to virtually assess the selected merchandise without actually having to try on the apparel.

20 Claims, 4 Drawing Sheets

CUSTOMER IMAGE CAPTURE AND USE THEREOF IN A RETAILING SYSTEM

CROSS-REFERENCE TO RELATED APPLICATIONS

The present application claims priority from U.S. patent application Ser. No. 60/170,057 entitled "A METHOD AND APPARATUS FOR CAPTURING IMAGE FORMS AND CHANGING CLOTHING TYPES ON THE IMAGE FORM" filed on Dec. 10, 1999.

TECHNICAL FIELD

The present invention is generally related to commercial systems and, in particular, to method and apparatus for capturing a person's image and using the captured image in a retailing system.

BACKGROUND OF THE INVENTION

"Putting the pants on" the customer is a long-standing term used in the fashion industry to explain to salespeople the need to show potential customers how they will look in various clothing styles. Tailors often said that a sale was not made until the customer "puts on the pants." When a customer tries on various clothing styles and colors, the process is very time consuming. The need exists for the customer to see a variety of clothing styles and colors applied to his/her body type to form an idea of how a particular clothing style or color will look on that person.

One attempt to address this need has been through the use of so-called virtual models. An example of such a system is found at the web site (http://www.landsend.com) for Land's End, Inc. By responding to a series of prompts regarding body shape, skin tone, hairstyle, eye shape, measurements etc, a customer is able to generate a computer simulation that approximates the customer's silhouette. The simulation or virtual model can be saved and recalled for later use. Having created a virtual model, the customer can select various clothing styles for display using the virtual model. In this manner, the customer is provided an approximation as to appropriate sizes. However, by its very nature, the virtual model provides virtually no detail regarding the customer's actual appearance. Additionally, the virtual model is generally displayed as a static image on a generic background. That is, the customer is not able to assess the appearance of the selected merchandise as it would appear when the customer is actually moving around within a variety of background settings.

U.S. Pat. No. 5,551,021 issued to Harada et al. (the "Harada patent") also discloses a system in which images of customers (captured through the use of a still image camera) are electronically stored. Later, when a customer is contemplating additional clothing purchases, a store clerk operating the system is able to recall the customer's image and display a composite of the customer's image with clothes that the customer has previously tried on or already owns. In this manner, the store clerk may better advise the client in coordinating contemplated purchases with clothes previously considered or owned by the customer. However, the Harada patent suffers from the same limitations as the virtual model system described above. Additionally, the Harada patent only displays the customer's image in conjunction with clothing already considered or owned, and does not allow the customer to see clothing styles that he or she is currently considering applied to his or her image.

Thus, it would be advantageous to provide a computerized system whereby clothing styles are applied to an actual image of a customer without the attendant limitations of prior art systems. Such a system would reduce shopping time for the customer because the customer does not have to physically try on articles of clothing. Additionally, there would be less likelihood of the customer returning an untried article of clothing or deciding that the clothing style does not fit or is unflattering or does not coincide with the fashion image the customer desires to portray, thereby saving merchants the cost of returned items.

SUMMARY OF THE INVENTION

The present invention allows apparel retailers and other purveyors of such items an opportunity to virtually "dress" the potential customer in featured merchandise as a virtual "fitting." As used herein, apparel includes clothing, accessories or any other items for which customer purchase decisions are typically based in part upon how the item appears when used by the customer. Through manipulation of digitized images, an image of the customer in a new apparel style is displayed. In addition, the image of the customer wearing the new apparel style can be shown under different lighting and background conditions such as in the evening at a restaurant, in a very dark dance hall, in a moderately lit boardroom, or walking along a downtown street during daylight hours. Sound effects and music can also be added to offer a fuller, more intense-effect viewing environment and enhance the entertainment aspects provided by the present invention.

The computer system is capable of merging video or still images of live, ordinary customers with video or still images of stored reference model images wearing the apparel. The computer system retrieves the stored reference images from a database and applies the stored reference image to the digitized image of the customer's body. The potential customer is shown in the featured apparel (the stored reference image) by displaying the composite image on a video display. The composite can be offered as a still picture or animated to a specific situation. In one embodiment of the present invention, routing of store traffic through a predefined walkway facilitates capture of customer images. To maximize the quality of the composite image, the walkway preferably has the same physical characteristics and lighting to that used in obtaining the reference images. Knowledge (or estimates) of a potential customer's weight and body height helps ensure a close match of the stored reference images to the captured image, creating a more realistic viewing of how the apparel style or color will look on the potential customer. The computer is capable of distinguishing differences between body sizes and is capable of filling in variations. A value system or weighting system assigns a value to distinguish the various body forms of customers.

BRIEF DESCRIPTION OF THE DRAWINGS

In the detailed description of presently preferred embodiments of the present invention which follows, reference will be made to the drawings comprised of the following figures, wherein like reference numerals refer to like elements in the various views and wherein.

DETAILED DESCRIPTION OF THE INVENTION

Figure 1:
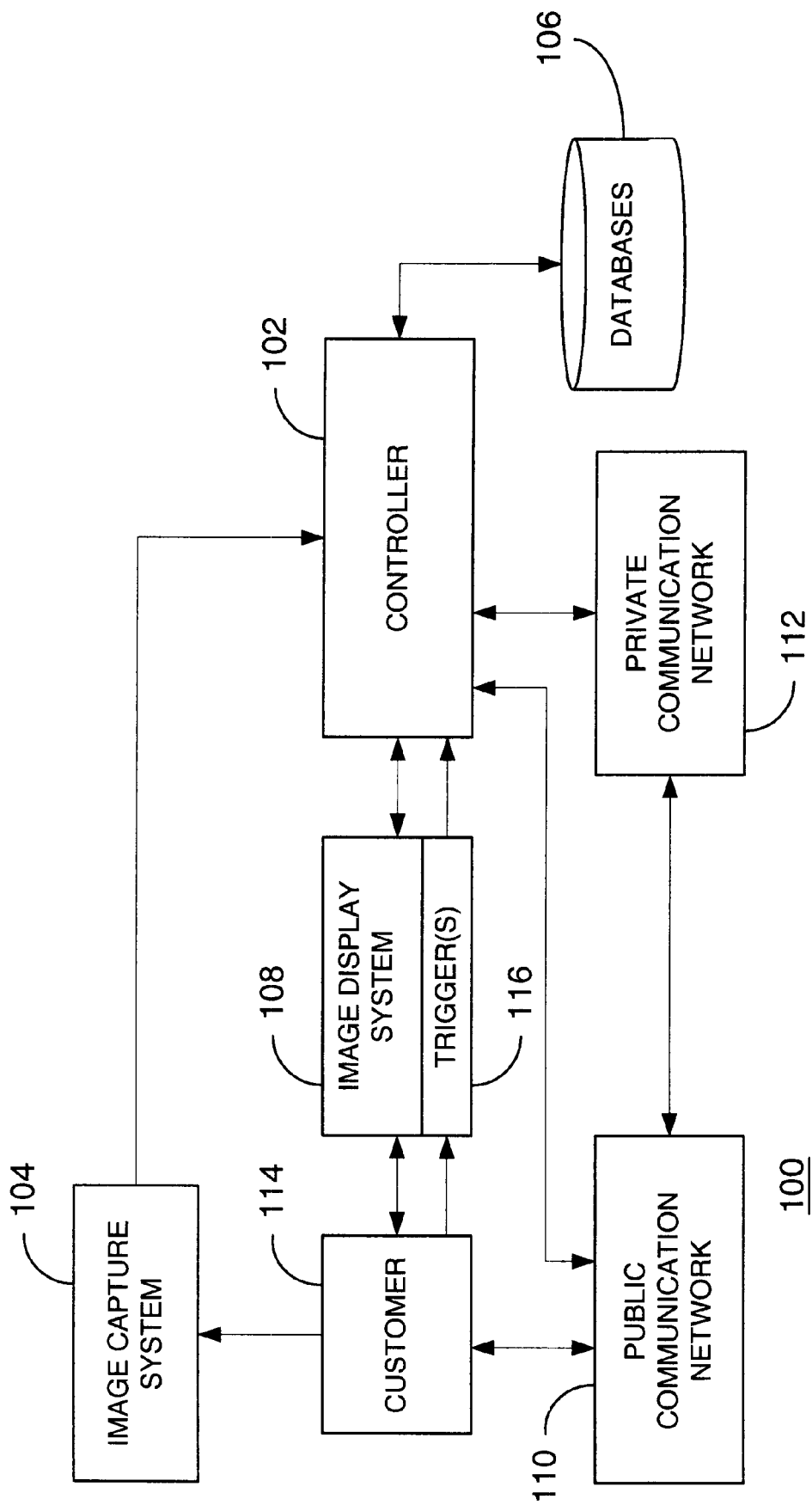
FIG. 1 is a block diagram of a computer-based system in accordance with the present invention.

The present invention is more readily described with reference to FIGS. 1–5. FIG. 1 illustrates a computer-based system 100 in accordance with the present invention. The system 100 comprises a controller 102 coupled to an image capture system 104, databases 106, an image display system 108, a public communication network 110, a private communication network 112 and one or more trigger devices 116. The controller 102 may comprise one or more computers or servers capable of executing software instructions stored in memory (e.g., volatile or non-volatile digital storage devices) via a suitable processor (e.g., microprocessor, microcontroller, digital signal processor or the like or combinations thereof). As described in greater detail below, the image capture system 104 comprises one or more image capture devices, such as at least one full motion video camera or at least one still image camera, or a combination thereof. In a preferred embodiment, the image capture devices provide a digital signal output, although an analog output that is subsequently converted to digital form may also be used. The controller 102 is coupled to databases 106 for the storage of images captured by the image capture system 104. Information correlating captured customer images to particular customers, as well as other data describing each customer's body type, etc. may also be stored in the databases 106. Furthermore, the databases 106 preferably comprise stored apparel style or reference images described in greater detail below. Although multiple databases 106 are illustrated in FIG. 1 and referred to in this description, those having ordinary skill in the art will recognize that a single database of sufficient storage capacity could be used.

The image display system 108 preferably comprises at least one display screen capable of displaying high-quality video or still images. When deployed in a retail environment, several such display screens may be placed throughout the business such that a plurality of customers may be simultaneously using the system 100 at any given moment. In a distributed computing environment, the image display system 108 may also include one or more computers, or similar computing platforms and associated memory, capable of performing image manipulations described below. The image display system 108 allows composite images, comprising one or more captured customer images combined with one or more of the stored reference images, to be displayed to a customer in close proximity to one of the display screens. The trigger devices 116, each preferably deployed integrally with or in close proximity to the display screens, may be activated through direct customer input or automatically. Examples of suitable trigger devices 116 include, but are not limited to, keypads, card readers, touch screens, cameras or the like or combinations of such devices. When activated, each trigger device 116 informs the controller 102 of the presence of a customer 114 near a display screen, thereby initiating display of an appropriate composite image.

The public communication network 110, such as the Internet or World Wide Web, or the private communication network 112, such as a retailer's intranet or extranet, allows customers 114 to access composite images or other customer information (such as account information, biometric data, preferences, etc.) via the controller 102. Conversely, the customer 114 can provide data, such as one or more customer images for use in generating composite images or updated customer information) to the controller 102 via either or both of the public and private communication networks 110, 112. Communications via the either or both of the public and private communication networks 110, 112 can be implemented using secure access links, as known in the art.

Figure 2:
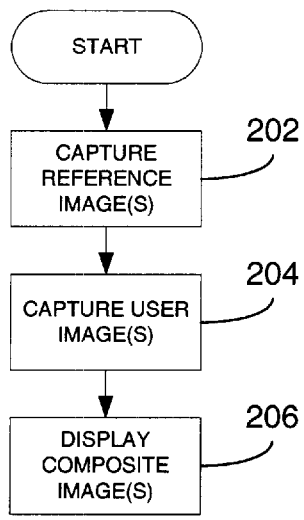
FIG. 2 is a flowchart illustrating a method in accordance with the present invention.

Using the system 100 described above, the present invention provides retailers or other providers of apparel the opportunity to let customers visually assess the items without having to actually try the item on. To achieve this, the present invention provides a three-step process generally illustrated in FIG. 2. At step 202, one or more reference images are captured. In the context of the present invention, a captured image has been edited or modified as necessary and stored for later access. Reference images comprise various apparel items as worn by models and edited to remove at least some portions of the image other than the apparel item being worn, i.e., the models' face, hair, hands, legs, etc. At step 204, one more customer images are captured. Note that both the reference images and the customer images may comprise full motion video or still images. In contrast to the reference images, the customer images, when edited, may include only the customers' face, hair, hands, etc. Then, at step 206, a composite image comprising any one of the reference images and any one of the customer images is generated and displayed. In effect, the composite image combines each customer's actual appearance (as dictated by his or her facial features, hair color, etc.) with an image of the desired apparel item as it would appear when worn by a person having a similar body shape to the customer. In this manner, the customer is able to more accurately assess the appearance of the item when worn by the customer without having to actually try on the item. Each of the steps illustrated in FIG. 2 are more fully described with reference to FIGS. 3–5 below. As those having ordinary skill in the art will recognize, certain steps described relative to FIGS. 3–5 may be implemented as stored software instructions executed by a suitable processor.

Figure 3:
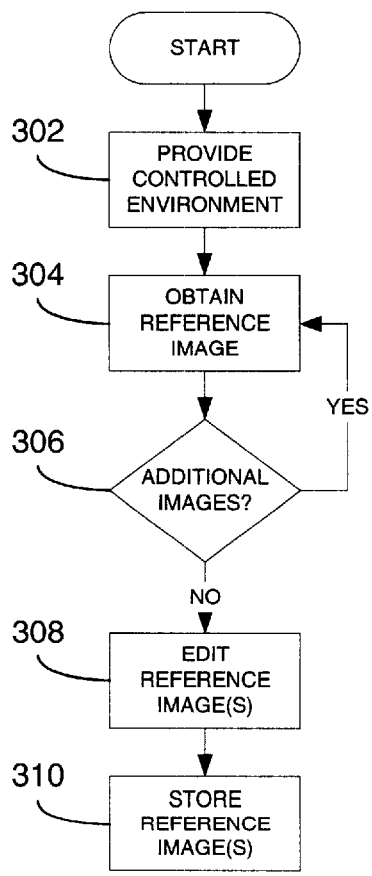
FIG. 3 is a flowchart illustrating capture of at least one reference image in accordance with the present invention.

Referring now to FIG. 3, a process for obtaining reference images is described in greater detail. At step 302, a controlled environment for obtaining images of the apparel items, as worn by models, is provided. As used herein, the phrase "controlled environment" encompasses a environment that is reproducible, particularly as part of the image capture system 104 of FIG. 1. To this end, the controlled environment preferably comprises at least one CCD digital video camera (e.g. DNE11 or EditCam) capable of recording digital images to the memory of a computer. Any computer capable of storing and processing large amounts of digital images may be used for this purpose. Because of the data storage requirements inherent in digital video, large memory storage systems are typically required, particular for high-quality images. A runway is provided of sufficient length such that up to twenty seconds of video data could be obtained of a model traversing the runway at a normal walking pace. Physical layouts other than a runway are possible. In a preferred embodiment, one or more fixed, vertical posts are erected at the end of or along the runway with a camera array or lens array mounted at 62 inches (1.57 meters), 64 inches (1.63 meters), 66 inches (1.68 meters), 68 inches (1.73 meters) and 70 inches (1.78 meters). Of course, other mounting heights can be selected as a matter of design choice. Similarly equipped posts at forty-five degree angles relative to the end post(s) are also preferably provided in order to capture a full 180° view, although other ranges are possible. Selection and positioning of lighting elements are preferably determined according to well-understood lighting principles in order to best capture the image of the selected apparel and to achieve the desired effect of shadows, etc. Additional lighting effects can be added or modified during editing to add background or fine tune the image transformation prior to archiving the reference images.

Preferably, the merchant who desires to market fashion merchandise using the present invention selects the desired range of body sizes for each selected apparel style. The merchant selects the background to match the garment's VAT (Value, Attitude and Trend) to the potential customer, as envisioned by the merchant. Subsequently, at steps 304 and 306, reference images are obtained. To this end, video or still images of models, having a variety of body sizes typical to the majority of potential customer' body forms and wearing corresponding sizes of the selected apparel item, are taken within the controlled environment, i.e., walking down the runway. Techniques such as retrolooping may be employed to minimize the number models needed to capture images for each of the desired sizes and body types. Prior to recording, a visual reference may be referred to gauge apparel sizes. Preferably, the images of the models are captured before a blank background, such as a uniformly blue or green screen, depending on the color of the apparel being worn. Additionally, the models preferably wear a hood or cowl, gloves, leggings etc of the same color. This facilitates the process of editing out the extremities of the models (e.g., head, hair, hands, legs etc) as well as the addition of suitable background images. As the images are obtained, they are preferably stored directly to memory residing in a computer or similar device. Alternatively, the images could be stored within the one or more cameras for subsequent downloading. Steps 304 and 306 are repeated until the desired range of images is obtained.

When a sufficient number of body sizes and types are recorded for a given apparel item, the images are edited at step 308 to remove the parts of the image other than the apparel style, i.e., the models' face, hair, hands, legs, etc. Such editing can be accomplished using existing software such as Avid SoftImage or Adobe After Effects. Using these programs, the editor makes creative choices regarding diminishment of these elements, or adding shoes or fashion accessories to enhance the overall effect to accommodate different styles of the apparel item. To this end, the editor may rely on special instructions that allow for a low-cut garments, replacing long or short sleeve lengths, add or eliminate certain areas in order to obtain a best fit, etc. Lighting or shadows can be added or eliminated and suitable background images matted into the images. Further still, additional effects such as sound effects or background music can be added to the references images.

At step 310, the edited reference images are stored, for example, in the database 106 shown in FIG. 1. Storage programs and visual pattern recognition programs are used to create the database of edited apparel styles. The edited apparel styles may be stored separately or combined with other meta information, i.e., information that describes each reference image in some manner, such as identification of each apparel style, body type, etc. Once the edited apparel style data is stored, the client (merchant) has the opportunity to approve, and request further edits of, the stored reference images. At this point, the stored reference images are ready to be combined with customer images. The merchant preferably identifies potential customers based, for example, on mailing or customer lists, surveys or using any other means known in the art. Once the potential customers are identified, a flyer or incentive notice can be mailed to the customer or otherwise published in order to give the potential customer sufficient incentive to use the commercial system of the present invention. The mailing can be a cooperative effort between the merchant implementing the retailing system and some other organization, such as a apparel designer. The process of capturing customer images is further described with reference to FIG. 4.

Figure 4:
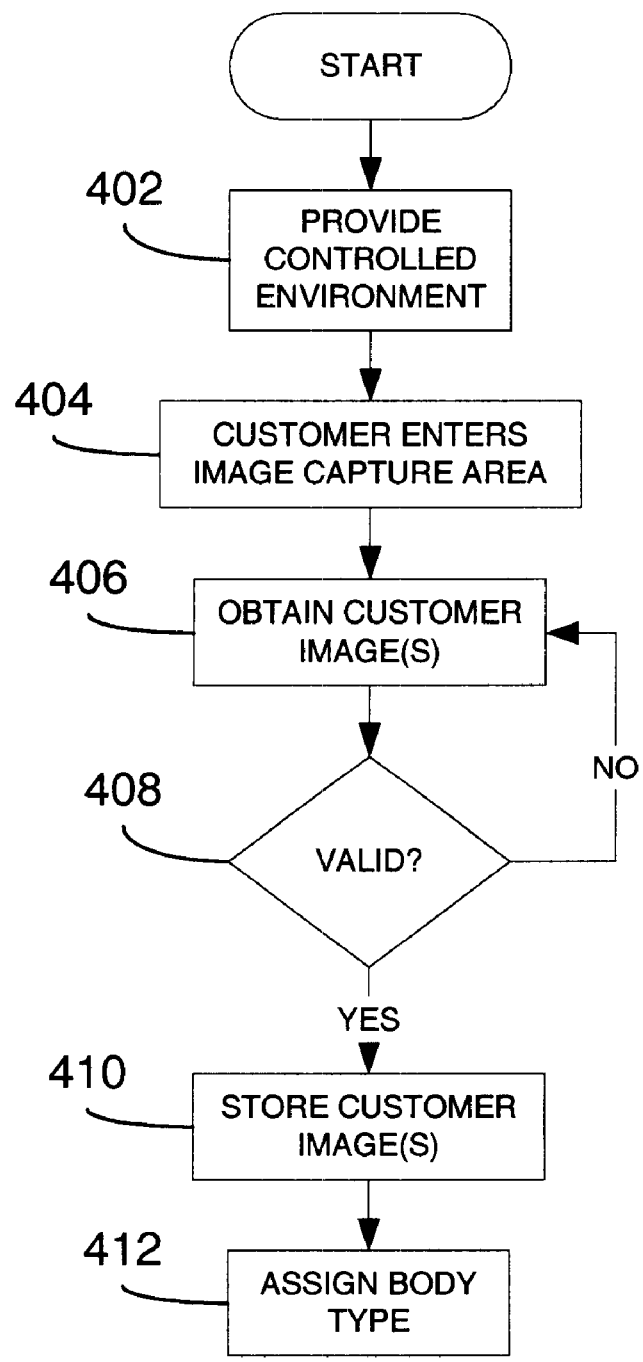
FIG. 4 is a flowchart illustrating capture of at least one customer image in accordance with the present invention.

Referring now to FIG. 4, a process for obtaining customer images is described in greater detail. At step 402, a controlled environment as closely identical as practicable to that used to capture the reference images (described above relative to FIG. 3) is provided within the image capture system 104. In particular, the physical construction of the runway, the lighting angles, color and intensities, etc. are substantially similar to those used to capture the reference images. The construction of the image capture area is preferably flexible in design, portable and lightweight, and strong enough to support equipment such as display monitors and cameras. Several alternative placements of the controlled environment are described below.

At step 404, a customer enters the controlled environment of the image capture system 104 and activates image capture. Using known techniques (e.g., motion detection or pattern recognition), the activation of image capture is preferably performed automatically. However, in an alternate embodiment, an operator may be provided to assist the customer and manually activate image capture; such an implementation may be preferable in some instances in order to personalize the experience. In order to capture the customer's image at step 406, the customer walks along the runway of the controlled environment. Preferably, an initial reference point is provided within the controlled environment to properly align the customer at the same starting point used by the models during capture of the reference images. Because of the similarity of the controlled environments used, the same camera angles and heights are used when acquiring the customer's body image. The similarity of the resulting customer images to the stored reference images allows a more accurate determination of the customer's biometrics, i.e., body size and shape.

At step 408, it is determined whether the image(s) captured at step 406 is valid. Using existing biometrics identification software such as Imagis ID 2000, a valid event occurs when a full face comprising eyes, a nose, mouth, etc. is detected. Where a camera array or lens array is used, the camera or lens with the greatest approximate validity (i.e., most of the face) would be used as the recording camera. A minimum of seven to ten seconds is considered sufficient to capture a valid event. In this time, eye-level, height, weight and body type can be identified. Two additional posts could be erected at forty-five degree angles to the main post. Camera array or lense arrays can be mounted to the other posts and activated according to their relationship to the camera determined to be the recording camera on the main post. Although this is not necessary, this arrangement can be used to obtain a full 180 degrees or more of image. If the image captured at step 406 is not valid, the process of obtaining the customer's image (i.e., step 406) is repeated until a valid image is obtained.

At step 410, the valid customer image(s) is stored in memory, for example, the database 106 of FIG. 1. In one embodiment of the present invention, storage may be long term, thereby allowing the customer's image to be accessed at any time, or may be short term, i.e., for the duration of a single event. Storage preferably occurs after the customer has manifested his or her approval of the process. For example, where the customer was sent a promotion (such as a piece of die cut cardboard or the like) that uniquely identifies that customer (e.g., through the use of a bar code or other data), the customer can cause the image capture system to accept the customer's information encoded therein. In this manner, the customer identification information can be associated with the customer's image. Alternatively, an input device (keypad, touch screen, etc.) can be provided as part of the image capture system such that the user is able to approve of the captured image and enter his or her identification information. Regardless, assuming that the customer's image is stored, along with information identifying the customer, a body type value is assigned to the customer's image at step 412. This is preferably done by an operator of the system. Standard body and garment measurements are defined in FashionDex's "Apparel Design and Production Handbook", the teachings of which are incorporated herein by this reference. Suitable body types include, but are not necessarily limited to, small, medium and large and subsets of petite and full size as established by FashionDex. Once stored, the customer's image may be made available to the customer via the public or private networks 110, 112. Additionally, the customer's image may be made available for use with other retailers having access to the databases 106. Further still, a code is assigned to the customer's stored body image, which code is given to the potential customer for use in any of the participating merchant stores, as described in greater detail below.

Figure 5:
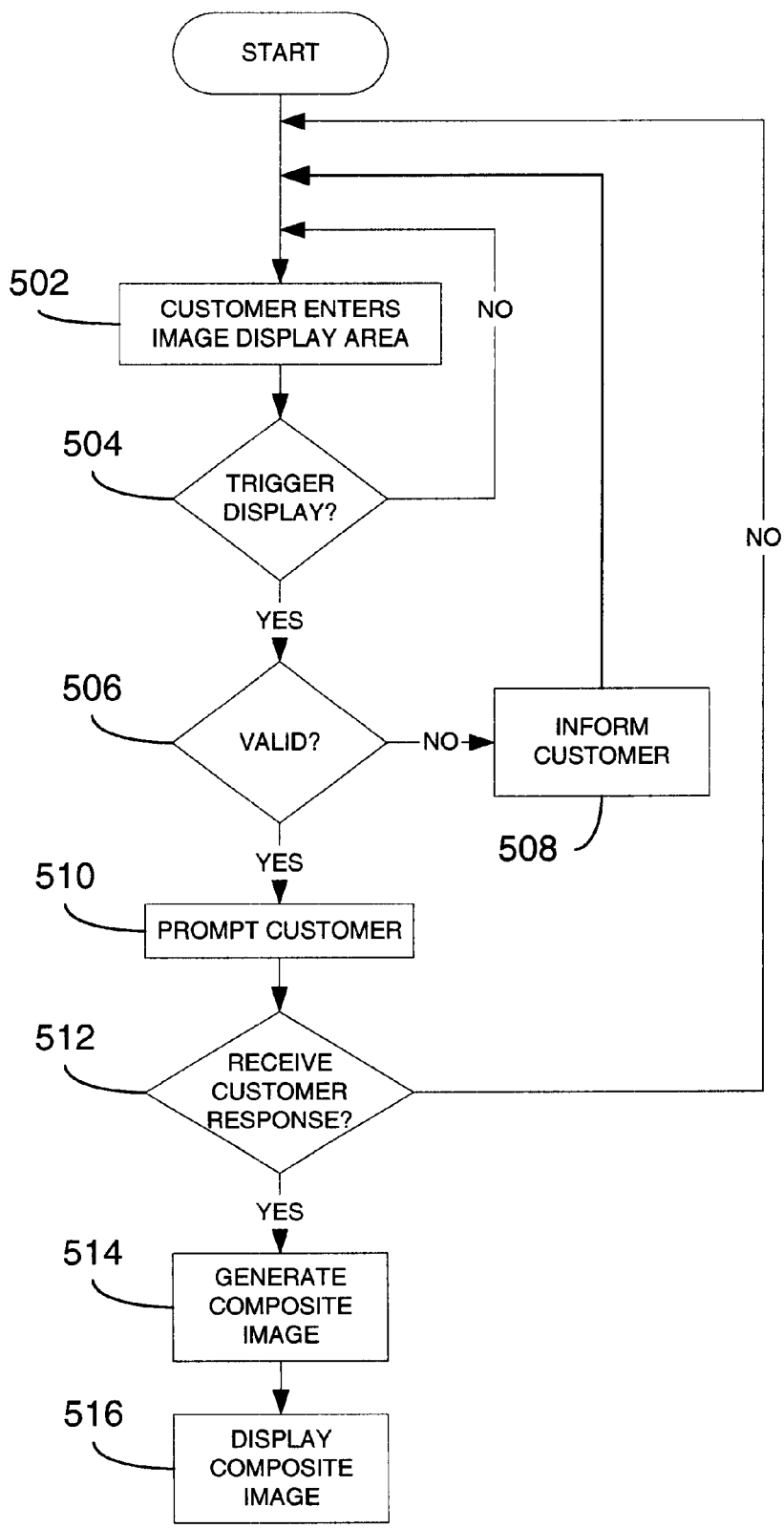
FIG. 5 is a flowchart illustrating display of a composite image in accordance with the present invention.

Referring now to FIG. 5, a process for displaying composite images is described in greater detail. At step 502, a customer enters an image display area (e.g., approaches a display screen) of the image display system 108. In a retail other merchandising environment, the image display areas are preferably positioned throughout the environment in close proximity to certain apparel items for which stored reference images are available. In another embodiment, the display area may be completely separate from a retailer's place of business, i.e., within another place of business or even the customer's home.

At step 504, it is determined whether a trigger device 116 has been activated. In the context of the present invention, activation of a trigger device at a minimum indicates that a customer is in close proximity to an image display area because the trigger devices are preferably integral with or in close proximity to the device used for display purposes. A variety of trigger implementations are possible. In one embodiment of the present invention, the trigger device 116 comprises a camera positioned to detect the presence of a person in viewing position relative to the image display area. In this case, a trigger event occurs, for example, if the customer remains within the image display area for at least a predetermine amount of time, e.g., 7 or more seconds. Suitable cameras for this purpose include any charge-coupled device (CCD) three chip color video camera such as the Sony TRV 900 operating in conjunction with suitable pattern recognition programs such as Imagis Cascade ID 2000. The camera provides video or still image data to software, executed by either the controller 102 or a distributed computing platform included in the image display system 108, capable of pattern recognition. The pattern recognition software, such as that found in the Virage Videologger with Image Recognition retrieval, tags and retrieves the customer's image from the image display area with known reference points corresponding to the stored customer images. By comparing the features of the customer's face, as captured by the camera at the image display area, with the stored customer images, the recognition software provides an indication whether the customer currently within the image display area is represented within the stored customer images. If a sufficiently similar match is found, the trigger event is deemed valid at step 506. If a sufficiently similar match is not found, but several candidate matches are identified, the customer may be provided with information (i.e., names) associated with the candidate images and asked to provide data (e.g., a password or the code previously associated with the customer's stored image) sufficient to correlate the customer with one of the candidate images.

In another embodiment, rather than using camera and recognition software, the trigger device 116 comprises a data entry device, such as a keypad, touch screen, voice recognition interface or other similar device that allows a customer to input data uniquely associated with them. For example, when a customer encounters an image display area and wishes to view of composite image of themselves in a given apparel item, he or she can enter the code previously provided when the customer's image was captured (see discussion regarding FIG. 4 above). Other information capable of uniquely identifying individual customers includes, but is not limited to, account numbers, passwords and biometric information (e.g., voice prints, fingerprints, retinal scans, etc.). Regardless, if the data input by the customer matches data associated with any of the stored customer images, then it is determined at step 506 that a valid event has occurred.

If a valid event is not identified at step 506, processing continues at step 508 where the customer is informed that no match was made. Optionally, the customer may be prompted at this step to try again or, if they have not already had their image stored in accordance with the process of FIG. 4, they may be prompted to go to the image capture area 104 for appropriate processing.

At step 510, the customer is prompted whether they wish to have a composite image created. In one embodiment, the customer is informed that if they approve the generation of such a composite image, then they also approve of the use of the composite image throughout the entire store or in proximity to the trigger area. Preferably, an approval screen is displayed outlining theses terms and conditions. If, at step 512, the customer does not respond (typically within a predetermined of time) or rejects the offer to have a composite image displayed, then processing continues at step 502.

If, however, the customer does respond in the affirmative at step 512, a composite image comprising the customer's captured image (as identified at step 506) combined with a reference image of the selected apparel item is generated at step 514. Techniques for merging elements from separate video or still image sources are well known in the art as embodied, for example, in Adobe's After Affects Producer bundle program. The composite image comprises elements unique to the customer (i.e., face, hair, hands, legs, etc.) taken from the customer's captured image combined with the image of the apparel in the ambience background. Thus, the composite image, when displayed, provides a more realistic depiction of what the customer would look like in the selected apparel in the appropriate background. The particular stored reference image used to generate the composite image is selected based on a number of criteria. As note above, each of the display areas is preferably associated with a particular apparel item. In this manner, requests for composite images from a particular display area may be correlated with the apparel item associated with that particular display area. Additionally, the customer's size or body type, as determined by the data stored along with the customer's image, is used to access the appropriate reference image within a group of reference images corresponding to the apparel item. Furthermore, when the customer's image is first captured, the customer may fill out a questionnaire in order to better determine the customer's particular tastes. Based on this information, an appropriate reference image may be selected. Further still, the customer may be allowed to directly enter requests (for example, in response to the same questionnaire or without prompting) for other apparel styles or colors from the images stored in the database.

In one embodiment of the present invention, the controller 102 accesses the necessary customer and reference images and generates the composite image. In another embodiment, particularly applicable to a distributed computing system, the controller 102 accesses the necessary customer and reference images and sends them to a computing device resident in the image display system 108, i.e., the display from which the request for the composite image was received. The computing device that receives the customer and reference images from the controller 102 then generates the composite image. Regardless of the manner in which the composite image is generated, the composite image is displayed at step 516 on the display. Additionally, the composite image can be stored on a removable media such as a compact disc (CD) or digital video disc (DVD) and given to the customer for later reference. If the customer has an established e-mail address, the composite image can be sent via the public or private communication networks 110, 112 to the e-mail address provided. In another alternative, if the merchant has an interactive and secure World Wide Web or Internet web site, the customer can be permitted to access their digitized body image and generate composite images with the merchants apparel images. The customer can then order the garment directly over the web without the customer actually visiting the store.

The techniques described above may be described as a business-to-business model in which a commercial provider provides the retailing system 100 and all support needed to implement it to a merchant or retailer. However, a variety of other business models may be used to implement the present invention.

In a first alternative business model, a jetway used between an airport gate terminal and an aircraft is used as the runway portion of the controlled environment described above relative to FIGS. 3 and 4. The image display system 108 is incorporated into the aircraft, with trigger devices 116 provided in the form of cameras mounted in seatbacks. Authorization to display composite images may be manifested through an input device incorporated into a seatback display screen or mounted on an armrest or other convenient location. Based on the display of the composite images, orders may be taken on the plane and fulfilled upon reaching the flight destination, assuming availability of fulfillment centers at the destination.

In a second alternative business model, the image display system 108 is incorporated into a hotel room or publicly available kiosk. The merchandise available for display is preferably tailored to the specific environment, e.g., beachwear at a resort hotel. In this model, fulfillment of any orders taken may need to be done remotely.

In a third alternative business model, the reference images are limited to uniforms or other standardized apparel. This model is particularly applicable to large corporations (e.g., McDonalds, United Airlines, etc.) or the military where workers are required to wear apparel that fall strictly within corporate or government guidelines.

In a fourth alternative business model, a temporary dome or facility is erected within a common area of a shopping mall or the like. In this model, it is assumed that more than one retailer will sponsor and participate in the event. Within the dome, several different image capture areas are provided. Once a customer's image is captured, that customer has an incentive to visit one of the participating retailers. Each customer image captured at the dome can be conveyed to each retailer's database. At each of the participating retailers' place of business, image display systems are deployed as described above for the display of composite images based on each retailer's particular apparel line.

In a fifth alternative business model, the customer's captured image can be stored in a personal communication device, such as a cell phone, personal digital assistant (PDA) or palmtop computer. In this manner, the customer can selectively provide his or her image with any of a variety of retailers equipped to display composite images in accordance with the present invention.

While the foregoing detailed description sets forth presently preferred embodiments of the invention, it will be understood that many variations may be made to the embodiments disclosed herein without departing from the true spirit and scope of the invention. This true spirit and scope of the present invention is defined by the appended claims, to be interpreted in light of the foregoing specifications.

What is claimed is:

1. An apparatus for manipulating a customer image corresponding to a customer, comprising:
   a controller;
   an image capture system, coupled to the controller, that captures the customer image of the customer and provides the customer image to the controller;
   a database, coupled to the controller, for storing the customer image and at least one apparel style image corresponding to a potential purchase item; and
   an image display system, coupled to the controller, for displaying a composite image comprising the customer image and any one of the at least one apparel style image thereby allowing the customer to assess the potential purchase item without having to try it on.

2. The apparatus of claim 1, wherein the image capture system comprises a controlled environment substantially similar to another controlled environment used to capture the at least one apparel style image.

3. The apparatus of claim 1, wherein the image capture system comprises a digital camera, and wherein the at least one apparel style image and the customer image comprise full motion video.

4. The apparatus of claim 1, wherein the controller generates the composite image and provides the composite image to the image display system.

5. The apparatus of claim 1, wherein the controller provides the customer image and one of the at least one apparel style image to the image display system, and wherein the image display system generates the composite image from the customer image and the one of the at least one apparel style image.

6. The apparatus of claim 1, further comprising:
   a trigger device, coupled to the controller, that detects the presence of the customer and, in response, causes the composite image to be displayed by the image display system.

7. The apparatus of claim 6, wherein the trigger device comprises a data input device that provides customer identification information, input by the customer, to the controller, and wherein correspondence of the customer identification information to the customer image causes the composite image to be displayed.

8. The apparatus of claim 6, wherein the trigger device comprises a camera, coupled to the controller, that captures an authentication image of the customer when the customer is in proximity to the camera, and wherein correspondence of the authentication image to the customer image causes the composite image to be displayed.

9. The apparatus of claim 6, wherein the trigger device is associated with the potential purchase item, and wherein the one of the at least one apparel style image used to generate the composite image corresponds to the potential purchase item.

10. A commercial system comprising the apparatus of claim 6, wherein the image capture system is deployed in a jetway, and the trigger device and image display system are deployed within a seatback on an airplane.

11. A commercial system comprising the apparatus of claim 6, wherein the image display system is deployed within a hotel room.

12. A commercial system comprising the apparatus of claim 6, wherein the image display system is deployed within a publicly available kiosk.

13. A commercial system comprising the apparatus of claim 6, wherein the image capture system is deployed within a common area of a shopping mall, and the image display system is deployed within at least one retailer residing in the shopping mall.

14. A method for manipulating a customer image corresponding to a customer, the method comprising:

capturing the customer image;

generating a composite image comprising the customer image and one of at least one apparel style image corresponding to a potential purchase item;

displaying the composite image thereby allowing the customer to assess the potential purchase item without having to try it on; and storing the customer image, wherein the step of generating the composite image further comprises retrieving the customer image in response to a request for the composite image.

15. The method of claim 14, wherein the at least one apparel style image and the customer image comprise full motion video.

16. The method of claim 14, wherein the step of generating the composite image further comprises:

analyzing the customer image to select a body type corresponding to the customer image; and selecting the one of the at least one apparel style image based on the body type.

17. The method of claim 14, wherein the step of displaying further comprises:

detecting presence of a person near a display;

determining that the person corresponds to the customer image; and displaying the composite image in response to the step of determining.

18. The method of claim 17, wherein the step of determining further comprises comparing biometric information of the person with the customer image.

19. The method of claim 17, wherein the step of determining further comprises receiving, from the person, data uniquely associated with the customer image.

20. The method of claim 14, wherein the step of displaying further comprises:

detecting a presence of a person near a display;

determining that the person does not correspond of the customer image; and informing the person about a subsequent ac ion in response to the step of determining.

* * * * *